3,023,245
MANUFACTURE OF DYPNONE

Robert L. McLaughlin, Woodbury, and John W. Schick, Merchantville, N.J., assignors to Socony Mobil Oil Company, Inc., a corporation of New York
No Drawing. Filed Sept. 3, 1959, Ser. No. 837,779
10 Claims. (Cl. 260—590)

This invention is concerned with the manufacture of dypnone. It is more particularly concerned with a novel catalytic process for condensing acetophenone to dypnone and other useful products.

As is well known to those familiar with the art, dypnone, i.e., phenyl alpha-methylstyryl ketone, has a variety of uses. For example, in United States Letters Patent Number 2,510,009, it is disclosed as a primary plasticizer for vinyl resins. It is also useful as a perfume base and in coatings that must resist exposure to light. The use of dypnone, however, has been rather curtailed, because of its relatively high cost of manufacture and its consequent relatively high price. Several procedures have been proposed for manufacturing dypnone by condensing acetophenone. These processes are disadvantageous because they involve numerous process steps and require expensive catalysts in amounts in molar excess of the amount of water formed.

It has now been found that dypnone can be produced by a process that is relatively simple and economically feasible. It has been discovered that dypnone and triphenylbenzene can be prepared by the homocondensation of acetophenone in the presence of a montmorillonite clay or a synthetic silica-alumina catalyst.

Accordingly, it is a broad object of this invention to provide a process for producing dypnone. Another object is to provide a novel catalytic process for producing dypnone and triphenylbenzene. A specific object is to provide a novel catalytic process for effecting the homocondensation of acetophenone in the presence of a montmorillonite clay or a synthetic silica-alumina catalyst. Other objects and advantages of this invention will become apparent to those skilled in the art, from the following detailed description.

The present invention provides a process for making dypnone that comprises contacting acetophenone with a catalyst selected from the group consisting of acid activated montmorillonite type clay and synthetic silica-alumina at a temperature varying between about 125° C. and about 200° C. and for a period of time varying between about 2 hours and about 12 hours; the amount of catalyst used being between about 5 percent and about 25 percent, by weight of the acetophenone reactant.

The starting material in the process of this invention is acetophenone, which is available from many sources. Commercially, it is prepared by the Friedel-Crafts reaction between benzene and acetic anhydride. It is also obtained as a by-product in certain processes for preparing phenol.

The catalysts utilizable herein are acid activated montmorillonite type clay and synthetic composites of silica and alumina. In the runs described hereinafter a non-swelling bentonite clay of the montmorillonite type which had been activated by acid treatment to give a composition

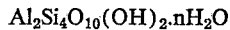

$$Al_2Si_4O_{10}(OH)_2 \cdot nH_2O$$

was used. This product is available in the activated state under the trade name "Super Filtrol." The acid activation treatment is well known to those skilled in the art and is described more or less in detail by B. A. Stagner in "The Science of Petroleum," volume III, page 1699 (Oxford Press) (1938). For the activation of small quantities of clay a similar treatment may be used. Thus, one kilogram of bentonite is boiled with 2,000 cubic centimeters of 17 percent sulfuric acid for three hours. The mixture is filtered and the clay washed with distilled water until the filtrate is substantially free from acid (0.2 to 0.5 percent acid). The clay is then dried to a moisture content of about 15 percent and ground to pass a 200-mesh screen. When the acid treated clay is washed with "hard" water after the acid is neutralized, the clay is injured by absorbing basic ions from the water.

When only a portion of the total extractable material is leached from the clay by the acid, the maximum activity is developed. The optimum concentration of the acid is about 15 percent to about 20 percent. Sulfuric and hydrochloric acids are the most economical to use although sulfuric acid is somewhat slower than hydrochloric.

The other type of material found effective as a catalyst herein are synthetic composites of silica and alumina which are acidic in nature. Such composites will contain about 7 percent and about 15 percent, by weight, of alumina, the balance being substantially silica. There appears to be nothing critical about the manner in which these composites are prepared. They may be made by any of the usual methods well known to those skilled in the manufacture of catalysts. A feasible method for preparing the catalyst involves adding an aqueous acidic solution, containing the required amount of aluminum salt, to an aqueous solution of sodium silicate, thus precipitating the silica and alumina simultaneously. This type of operation can be carried out in accordance with the method known in U.S. Patent No. 2,384,946 to produce the catalyst in a hydrogel bead form.

The homocondensation of acetophenone to dypnone by the process of this invention is accompanied by the formation of a trimer condensation product, triphenylbenzene, and small amounts of higher condensation polymer. Because of its high boiling point and its aromatic structure, the triphenylbenzene is utilizable as a reactor moderator or heat exchange medium in atomic reactors. The amount of trimer and higher polymers that is formed depends upon the severity of the process conditions and upon the amount of acetophenone that is converted per pass. The following examples are illustrative of the general process of this invention and the effect of reaction conditions.

EXAMPLE 1

A mixture of 500 grams (4.6 mols) of acetophenone and 40 grams of acid-treated montmorillonite clay was placed in a reaction vessel. This mixture was heated for 2 hours at a temperature of between about 150° C. and 200° C. During the course of the reaction 24 ml. of water were removed. At the end of the reaction time the product was filtered to remove the catalyst and subjected to vacuum distillation. There were obtained 167.4 grams of dypnone boiling at 148–150° C. under a pressure of 0.5 mm. mercury and 66.0 grams of triphenylbenzene boiling at 210–215° C. under a pressure of 0.8 mm. The latter product had a melting point of 172–173° C. which compares with a reported melting point of 173.7° C. There was also obtained 5.8 grams of a residue comprising higher weight polymers of acetophenone. In this run 52.3 weight percent of the acetophenone charge was converted into products. The unreacted acetophenone and the balance of unreacted acetophenone can be recycled giving an ultimate yield of dypnone of 64.0 percent.

EXAMPLE 2

A mixture of 500 grams (4.16 mols) of acetophenone and 40 grams of bead-form silica-alumina containing 10 weight percent alumina was heated at a temperature of 150–190° C. for 12 hours. During the course of the reaction 24.0 mls. of water were removed. At the end of the reaction time the reaction mixture was filtered to remove the catalyst and the product was subjected to distillation. There were obtained 134.4 grams of dypnone and 29.4 grams of triphenylbenzene. There was also obtained 49.2 grams of higher molecular weight residue. In this run there is obtained 46.6 weight percent conversion of the acetophenone. The ultimate yield of dypnone obtained by recycling unconverted acetophenone is 57.7 weight percent.

It will be noted that excellent yields of dypnone were obtained when using a shorter reaction time of 2 hours. When the reaction time is increased to 12 hours the yield of dypnone was lower. More significantly, however, the amount of higher molecular weight residue was markedly increased. This indicates that longer reaction periods would tend to increase the amount of higher molecular weight materials. Accordingly, by varying reaction conditions, the relative amounts of dimer and trimer can be controlled to suit current production needs.

It will be appreciated that the time of reaction is somewhat dependent upon the amount of water removed and the reaction temperature. In general, the reaction will be carried out for a period of time varying between about 2 hours and about 12 hours. It is preferable to carry out the reaction for a period of time of 4 to 6 hours.

The process of this invention can be carried out at a temperature varying between about 125° C. and about 200° C. At higher temperatures, however, there is a tendency for a decrease yield of dypnone and increased polymer formation. In preferred practice, the reaction will be carried out at temperatures varying between about 130° C. and about 150° C. An especially preferred set of conditions favoring dypnone production is to carry out the reaction at a temperature of about 150° C. for a period of time of 4 to 6 hours.

It is preferable to control the temperature and reaction time so that not more than about 55 weight percent of acetophenone is converted. The unreacted acetophenone is readily recoverable and can be recharged to the process thereby achieving high ultimate yields of dypnone. Any attempt to push the reaction to higher conversions of acetophenone usually results in increased high molecular weight polymer production.

As will be appreciated by those skilled in the art the amount of conversion is related to the amount of water that is evolved from the process. Although the reaction can proceed in the absence of solvents it is highly advantageous to use a nonpolar hydrocarbon solvent such as benzene, toluene or xylene. The solvent is beneficial in controlling the temperature at the desired point and at the same time enables the removal of the water evolved from the homocondensation reaction by distillation. The amount of solvent used is not critical and is somewhat dependent upon the size of the reaction system. There should be sufficient solvent present to support solvent refluxing and to support the azeotropic distillation of water.

The preferred methods carrying out the process of this invention are illustrated in the following examples:

EXAMPLES 3 THROUGH 10

In each of the runs represented by these examples a general procedure was followed. The acetophenone solvent and catalysts were replaced in a 1 liter flask equipped with a mechanical stirrer, thermometer, a water take-off side arm and a condenser. The temperature was gradually increased to the desired reaction temperature and water was removed by azeotropic distillation with the solvent. After the desired reaction period the amount of water that wae removed was noted and the mixture was cooled and filtered to remove the catalyst. The filtrate was stripped to a temperature of 200° C. in order to remove solvents and unreacted acetophenone. The residue was then vacuum distilled to recover a small amount of unreacted acetophenone and the major products, dypnone and triphenylbenzene. Pertinent data of reaction conditions, catalysts used, and the product yields are set forth in Table I.

*Table I*

| Ex. | Acetophenone G. | Acetophenone Mol. | Catalyst Type | Catalyst G. | Solvent Type | Solvent G. | Time, hr. | Temp., °C. | Water removed, ml. | Fraction No. 1, g.[1] | Fraction No. 2, g.[2] | Residue g. | Total, g | Dypnone Conv., percent | Dypnone Ult. yield, percent |
|---|---|---|---|---|---|---|---|---|---|---|---|---|---|---|---|
| 3 | 250 | 2.08 | Filtrol [3] | 50 | Xylene | 250 | 4.0 | 150 | 9.0 | 73.0 | | 8.0 | 81.0 | 35.1 | 83.2 |
| 4 | 272 | 2.27 | do [3] | 50 | do | 272 | 4.0 | 150 | 12.5 | 122.0 | 23.0 | 6.0 | 151.0 | 55.5 | 80.8 |
| 5 | 250 | 2.08 | do [3] | 20 | do | 250 | 4.5 | 150 | 8.5 | 96.2 | 5.0 | 1.8 | 103.0 | 44.6 | 86.3 |
| 6 | 250 | 2.08 | do [3] | 50 | do | 750 | 4.5 | 139 | 6.5 | 87.0 | | 6.0 | 93.0 | 40.3 | 86.4 |
| 7 | 250 | 2.08 | Silica-alumina [4] | 50 | do | 250 | 4.0 | 150 | 7.5 | 93.6 | 14.0 | 2.8 | 110.4 | 47.9 | 78.2 |
| 8 | 250 | 2.08 | do [4] | 50 | do | 250 | 4.0 | 150 | 10.0 | 85.3 | 8.9 | 2.8 | 97.0 | 42.0 | 81.0 |
| 9 | 250 | 2.08 | Filtrol | 50 | Benzene | 50 | 5.5 | 130 | 7.5 | 114 | | 5.0 | 119 | 51.4 | 88.7 |
| 10 | 250 | 2.08 | do | 50 | Toluene | 80 | 6.0 | 140 | 11.5 | 127 | 14.0 | 4.0 | 145 | 62.8 | 80.8 |

[1] Dypnone boiling at 148–153° C. at 0.5 mm. mercury pressure.
[2] Triphenylbenzene boiling at 210–215° C. at 0.8 mm. mercury pressure and melting at 172–173° C.
[3] Acid treated clay of the montmorillonite type.
[4] Synthetic bead-form silica-alumina catalyst containing 10 weight percent alumina.

It will be noted that the examples tabulated in Table I that excellent yields of dypnone and triphenylbenzene obtained by the process of this invention at temperatures of 130 to 150° C. for peroids of time varying between 4 hours and 6 hours. It is to be particularly noted that the maximum yields of dypnone to the exclusion of triphenylbenzene production were achieved when operating at 139° C. for 4.5 hours (Example 6) and at 130° C. for 5.5 hours (Example 9).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for making dypnone and triphenylbenzene that comprises contacting acetophenone with a catalyst selected from the group consisting of acid activated montmorillonite clay and synthetic silica-alumina containing between about 7 percent and about 15 percent alumina, by weight, at a temperature varying between about 125° C. and about 200° C., and for a period of time varying between about 2 hours and about 12 hours; the amount of said catalyst used being between about 5 percent and about 25 percent, by weight of the acetophenone reactant.

2. The process defined in claim 1 further characterized in that it is carried out in the presence of a non-polar hydrocarbon solvent.

3. A process for making dypnone and triphenylbenzene that comprises contacting acetophenone with an acid activated montmorillonite clay catalyst, at a temperature varying between about 130° C. and about 150° C., and for a period of time varying between about 4 hours and about 6 hours; the amount of said catalyst used being between about 5 percent and about 25 percent, by weight of the acetophenone reactant.

4. The process defined in claim 3 further characterized in that it is carried out in the presence of a non-polar hydrocarbon solvent.

5. The process defined in claim 3 further characterized in that it is carried out in the presence of a non-polar hydrocarbon solvent selected from the group consisting of benzene, toluene, and xylene.

6. The process defined in claim 3 wherein said temperature is about 150° C.

7. A process for making dypnone and triphenylbenzene that comprises contacting acetophenone with a synthetic silica-alumina catalyst containing between about 7 percent and about 15 percent alumina by weight of the catalyst, the balance being substantially silica, at a temperature varying between about 130° C. and about 150° C., and for a period of time varying between about 4 hours and about 6 hours; the amount of said catalyst used being between about 5 percent and about 25 percent, by weight of the acetophenone reactant.

8. The process defined in claim 7 further characterized in that it is carried out in the presence of a non-polar hydrocarbon solvent.

9. The process defined in claim 7 further characterized in that it is carried out in the presence of xylene.

10. The process defined in claim 7 wherein said temperature is about 150° C.

References Cited in the file of this patent

UNITED STATES PATENTS

| | | |
|---|---|---|
| 2,429,361 | Linn et al. | Oct. 21, 1947 |
| 2,769,842 | Bader | Nov. 6, 1956 |